United States Patent [19]
Hesse et al.

[11] 3,751,226
[45] Aug. 7, 1973

[54] BACKFLOW TEST FOR OIL CONCENTRATION

[75] Inventors: Robert J. Hesse, North Olmsted, Ohio; Robert F. Farmer, Baltimore, Md.

[73] Assignee: Shell Oil Company, Houston, Tex.

[22] Filed: Oct. 13, 1971

[21] Appl. No.: 188,446

[52] U.S. Cl............................................ 23/230 EP
[51] Int. Cl. .......................................... G01n 33/24
[58] Field of Search ................. 23/230 EP; 166/252, 166/250

[56] References Cited
UNITED STATES PATENTS
3,590,923  7/1971  Cooke, Jr. ........................... 166/252
3,623,842  11/1971  Deans ................................ 23/23 EP

*Primary Examiner*—Morris O. Wolk
*Assistant Examiner*—R. M. Reese
*Attorney*—H. W. Coryell et al.

[57] ABSTRACT

The concentration of oil phase fluid in subterranean reservoir is measured by injecting slugs of aqueous liquid containing a preferentially water soluble tracer (i.e., distinctive material) that reacts within the reservoir to form a tracer material that is relatively oil soluble and is partitioned between the oil and water phase fluids.

5 Claims, No Drawings

BACKFLOW TEST FOR OIL CONCENTRATION

RELATED PATENT APPLICATION

The present patent application is related to patent application, Ser. No. 2766, filed Jan. 14, 1970, by C. A. Chase, Jr., and M. Prats now U.S. Pat. No. 3,690,167. The prior application describes a testing procedure in which fluid is injected into the reservoir in the form of slugs of aqueous liquid that alternately contain and are free of a "tracer," or distinctive material, that is selectively water soluble and substantially inert within the reservoir. That process is particularly useful with respect to measuring the diffusion capacity of the reservoir. The present process can be used in conjunction with the process described in the prior application and the disclosure of the prior application is incorporated herein by reference.

BACKGROUND OF THE INVENTION

This invention relates to a testing procedure for injecting fluids into and backflowing fluid from a reservoir that contains both oil phase and water phase fluid, in order to measure the concentration of the oil phase fluid. This invention provides a process for supplementing and/or replacing a reservoir testing procedure of the type described in the patent application mentioned above.

SUMMARY OF THE INVENTION

In accordance with this invention, the concentration of oil phase fluid in a reservoir that contains both oil phase and water phase fluid is measured by injecting an aqueous liquid solution containing a preferentially water soluble tracer that is hydrolyzed within the reservoir to form at least one reaction product that is significantly oil soluble and is partitioned between the oil and water phase fluids, backflowing fluid from the reservoir, and measuring the concentration with time of the injected tracer and its reaction to product.

In a preferred procedure, the present invention is practiced by an injection of a compound, A, (followed by a slug of water) that reacts irreversibly at a relatively slow rate compared to the injection time such that upon stopping the flow it has produced significant proportion of compounds, B and C. If B partitions with the oil and C does not, upon backflow, $S_{or}$ can be calculated by the chromatographic relation:

$$t_B/t_C = 1 + (S_{or} K_{o/w})/(1 - S_{or})$$

Where:
  $K_{o/w}$ = partition coefficient = concentration of chemical in oil/concentration of chemical in water
  i $S_{or}$ = residual oil saturation
  $t_B$ = time between beginning of backflow and appearance of B
  $t_C$ = time between beginning of backflow and appearance of C In general the partitioning chemical, B, should be a polar organic compound having an affinity for both oil and water phase fluids. This implies that the reaction chemical, A, be organic with a functional linkage that makes it oil insoluble and undergoes a hydrolysis reaction within the reservoir.

There are many advantages to this approach: a) the rate constant need not be known exactly; b) finding a product that partitions with a large number of oils is easier than finding a product that reacts irreversibly with oils.

It is desirable that dispersion and flow control be known as accurately as possible, so that $t_B$ and $t_C$ can be calculated. Calculations based on this idea show that if the proper variables are chosen, accurate results are feasible.

A preferred class of components and reactions comprise:

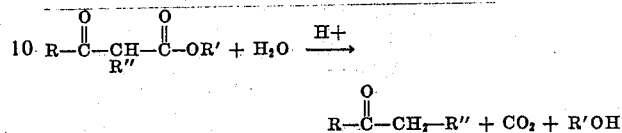

The reaction rates for such reactions are within reasonable limits. Such compounds are B-keto esters in which the length of the hydrocarbon chains in the groups R, R', and R'' can be varied. The partitioning properties of the hydrolysis products, particularly the ketones,

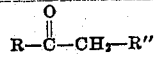

vary with differences in the chain lengths. By varying the chain length of R, the oil-water partition coefficient can be varied.

By varying R', the units to which R' are attached can be made substantially oil insoluble and water soluble. For example, if R' is chosen to be a polyethylene glycol group, the polyhydric alcohol is substantially completely insoluble in oil.

By varying R'' (and possibly R and R'), a desired reaction rate constant can be obtained. The rate constants at which several beat-ketoesters are hydrolyzed at several temperatures and concentrations have been studied. An attractive ester for use in the present process is ethyl acetoacetate (EAA) which hydrolyzes as follows:

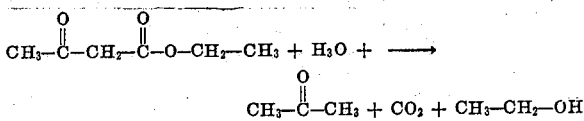

The nuclear magnetic resonance spectra, NMR, of EAA, acetone, and ethyl alcohol in water is such that NMR can be used to give the desired rate data. Cadmium chloride can be used to assign the proton resonance lines and the rate constants can be calculated from the concentration with time of EAA and acetone in the hydrolysis reaction products.

In one preferred procedure an aqueous solution that contains both a readily hydrolyzable beta-ketoester having at least one decomposition product that partitions between oil and water phase fluids and an inert water soluble tracer material that is substantially oil insoluble i.e., is a substantially exclusively water soluble tracer material is injected into a reservoir that contains both water phase and oil phase fluids. Slugs of aqueous liquids containing such tracer materials are preferably alternated with slugs of similar aqueous liquids devoid of the tracer materials. The injected fluid is allowed to remain within the reservoir until a significant amount of hydrolysis has occurred and is then backflowed and recovered. The concentrations of the oil phase fluid in the reservoir is calculated from the concentrations of the tracer materials and hydrolysis products with time in the fluid that is backflowed and recovered.

With respect to the selectively water soluble tracer material, materials such as tritium or water containing a water soluble radioactive salt or the like can used. The tracer concentration within the well bore is governed by the solution to a convective diffusion equation. A one-dimensional model is assumed in which the flow of carrier fluid is at a constant volumetric rate in the radial direction. The dispersion coefficient is assumed to be a function of the fluid velocity. Following Perkins et al, (Perkins, T.K. and Johnston, O.C. (1963), Review of Diffusion and Dispersion in Porous Media, J. Soc. Petr. Engr., March, p. 70.), the functional form is taken as $$K/D_o = D_m/D_o + (\alpha \, d_p \, u/D_o \, \phi')^\beta \quad (1)$$

In dimensionless form, the convective diffusion equation becomes:

$$r_D \, \delta C_D/\delta t_D + \delta C_D/\delta r_d - \delta/\delta r_D \{[a_1 \, r_D + a_2 \, r_D \, 1-\beta] \, \delta C_D/\delta r_D\} = 0, \quad (2)$$

where the dimensionless radial coordinate $r_D = r_A/r_d$ (3)

dimensionless time $t_D = q_A \, t_A/\phi' r_o^2$ (4)

$$\phi' = (1 - S_{or}) \, \phi \quad (5)$$

$$a_1 = D_m \phi'/q_A \quad (6)$$

$$a_2 = (q_A/D_o\phi')^{\beta-1} \, (a \, d_p/R_o)^\beta \quad (7)$$

$q_A = \frac{1}{2}\pi \, i/h$ = volumetric injection rate per radian per unit of height (8)

$r_o$ = arbitrarily chosen scale factor for length

By matching solutions of Equation (2) with field test data, estimates of the parameters $a_1$, $a_2$, and $B$ may be obtained from which $\phi'$ and the dispersion parameter $ad_p$ may be calculated.
Where:
$S_{or}$ — Residual oil saturation
$K$ — Dispersion coefficient
$D_o$ — Molecular diffusion coefficient of tracer
$D_m$ — Molecular diffusion coefficient of tracer in porous material
$a$ — Inhomogeneity factor used in correlation of dispersion coefficients
$d_p$ — Average particle diameter of porous material
$u$ — Darcy flow velocity vector
$\phi'$ — Mobile fluid fraction
$\beta$ — Dimensionless parameter
$r_D$ — Dimensionless radial coordinate
$C_D$ — Dimensionless tracer concentration
$t_D$ — Dimensionless time
$a_1$ — Dimensionless parameter
$a_2$ — Dimensionless parameter
$r_A$ — Radial coordinate
$t_A$ — Time
$\phi$ — Reservoir rock porosity
$i$ — Injection rate
$H$ — Height
$r_o$ — Arbitrarily chosen scale factor for length
$a_A$ — Bulk volumetric flow rate

EXAMPLE I — Core Test

A 10-inch Berea sandstone core, water permeability $K_w$ = 500 md, porosity = 0.2 and pore volume $PV$ = 105.4 milliliters was maintained at 70°C and arranged for fluid displacement through the core. It was subjected to inflow of water, n-dodecane and water, to leave a dodecane concentration $S_{or}$ = 0.37.

A 0.1 PV slug of aqueous liquid solution of hydrolyzable tracer was injected and displaced through the core for about 75 percent of its length. The slug had the following composition:

1. 0.5M ethyl aceto acetate,
2. 0.1M potassium hydrogen phthalate,
3. 0.02M NaCl, and
4. tritiated water to yield approximately 1200 cpm.

Both the drive solution and the water with which the core was flooded were 0.025M in NaCl and 0.1M in potassium hydrogen phthalate. The potassium hydrogen phthalate served as a buffer, approximately pH 4, and was simply a precaution. Water in contact with Berea sandstone can reach a pH as high as 8. Sufficient time, 11 days, was allowed for ester decomposition to occur. Flow was reversed and effluent solution was analyzed for acetone and tritium content. High resolution NMR spectroscopy served to locate the center of the produced band of acetone.

Hydrocarbon saturation was calculated from the relative positions of the centers of the acetone and tritium bands.

Consider $E \rightarrow A + B + C$ where both E and A are partitioned between oil and water and there is also present the nonpartitioning tracer, D.

Let: $E$ = ester
$A$ = acetone, and
$D$ = tritiated water.

Suppose A is injected into the core and the reaction occurs in place. Now, reverse the flow and monitor the effluent solution; i.e., the above experiment. The experimental data are:

$V_A$ = volume of liquid collected before acetone appears, and
$V_D$ = volume of liquid collected before tracer appears.

In addition, define the following terms:
$\Delta V$ = chromatographic holdup of ester,
$K_{o/w}^E$ = partition coefficient of ester between hydrocarbon and water, and
$K_{o/w}^A$ = partition coefficient of acetone between hydrocarbon and water.

From the equation for the chromatographic relation, for injection, $$V_D + \Delta V/V_D = 1 + K_{o/w}^E(S_{or}/1 - S_{or}), \text{ and}$$

for production $$V_A/V_D - \Delta V = 1 + K_{o/w}^A(S_{or}/1 - S_{or}).$$

For brevity, let $(S_{or})/(1 - S_{or}) = J$, then $$\Delta V = k_{o/w}^E V_D J, \text{ and}$$
$$V_A - V_D = -\Delta V(1 + K_{o/w}^A j) + K_{o/w}^A V_D J.$$

Substitute to obtain the quadratic equation, $$-K^A_{o/w} K^E_{o/w} V_D J^2 + (K^A_{o/w} - K^E_{o/w}) V_D J + (V_D - V_A) = 0,$$

the solution to which is $$J = \frac{-V_D(K^A_{o/w} - K^E_{o/w}) \pm \sqrt{V^2_D(K^A_{o/w} - K^E_{o/w})^2 + 4(V_D - V_A) K^E_{o/w} K^A_{o/w} V_D}}{-2 K^A_{o/w} K^E_{o/w} V_D}$$

We obtained, from experiment, the following values of the parameters:

$$V_D = 47.1 \text{ ml}$$
$$V_A = 32.7 \text{ ml}$$
$$K_{o/w}^E = 0.462$$
$$K_{o/w}^A = 0.096$$

The K's were measured between n-dodecane and the aqueous solution used in the core. Substituting into the above expression yields $J = 0.767$ and $S_{or} = 0.43$. Recall that, from material balance, the value of $S_{or}$ was 0.37. In view of the experimental and analytical difficulties that is good agreement. The core with which we worked was only 10 inches in length. The produced concentration bands were so diffuse that their centers could not be located with certainty.

What is claimed is:

1. In a process in which the concentration of oil phase fluid in a reservoir containing both oil and water phase fluids is measured by injecting an aqueous fluid containing at least one tracer material, backflowing fluid from the reservoir, and measuring the concentration with time of at least one tracer material, the improvement which comprises:

injecting an aqueous fluid containing a preferentially water soluble tracer material which hydrolyzes within the reservoir to yield a reaction product tracer material that is partitioned between the oil and water phase fluids within the reservoir; and measuring the concentration of the oil phase fluid in the reservoir by measuring the concentration with time of said tracer materials and the relation between such concentrations and a chromatographic separation of the tracer materials.

2. The process of claim 1 in which said tracer containing aqueous fluid is injected in the form of a series of slugs that alternate with slugs of aqueous fluid free of the tracer material.

3. The process of claim 1 in which said hydrolyzable tracer material is a beta-keto ester.

4. The process of claim 1 in which said aqueous fluid contains additional substantially exclusively water soluble tracer material which is substantially inert within the reservoir.

5. The process of claim 4 in which said hydrolyzable tracer material is a beta-keto ester and said substantially exclusively water soluble tracer material is tritium.

* * * * *